(12) United States Patent
Hull Roskos

(10) Patent No.: US 9,177,139 B2
(45) Date of Patent: Nov. 3, 2015

(54) CONTROL SYSTEM CYBER SECURITY

(71) Applicant: Honeywell International Inc., Morristown, NJ (US)

(72) Inventor: Julie J. Hull Roskos, Forest Lake, MN (US)

(73) Assignee: Honeywell International Inc., Morristown, NJ (US)

( * ) Notice: Subject to any disclaimer, the term of this patent is extended or adjusted under 35 U.S.C. 154(b) by 23 days.

(21) Appl. No.: 13/731,054

(22) Filed: Dec. 30, 2012

(65) Prior Publication Data

US 2014/0189860 A1    Jul. 3, 2014

(51) Int. Cl.
*G06F 21/55* (2013.01)
*G05B 23/02* (2006.01)
*H04L 29/06* (2006.01)

(52) U.S. Cl.
CPC .......... *G06F 21/552* (2013.01); *G05B 23/0235* (2013.01); *H04L 63/1408* (2013.01); *G05B 2219/31246* (2013.01); *G05B 2219/31255* (2013.01)

(58) Field of Classification Search
CPC .......................... G06F 21/552; H04L 63/1408
USPC ..................................................... 726/22–23
See application file for complete search history.

(56) References Cited

U.S. PATENT DOCUMENTS

| | | | |
|---|---|---|---|
| 6,088,804 A * | 7/2000 | Hill et al. ......................... | 726/25 |
| 7,436,297 B1 * | 10/2008 | Tucker .......................... | 340/541 |
| 7,617,170 B2 * | 11/2009 | Chesla ............................. | 706/46 |
| 7,784,099 B2 * | 8/2010 | Benjamin ........................ | 726/25 |
| 7,808,916 B1 * | 10/2010 | Futamura et al. ............. | 370/242 |
| 7,814,548 B2 * | 10/2010 | Mukhopadhyay et al. ...... | 726/24 |
| 7,844,696 B2 * | 11/2010 | Labovitz et al. ............. | 709/224 |
| 8,079,080 B2 * | 12/2011 | Borders .......................... | 726/22 |
| 8,191,139 B2 * | 5/2012 | Heimerdinger et al. ........ | 726/23 |
| 8,549,139 B2 * | 10/2013 | Labovitz et al. ............. | 709/224 |
| 8,553,646 B2 * | 10/2013 | Kumar .......................... | 370/331 |
| 2003/0037136 A1 * | 2/2003 | Labovitz et al. ............. | 709/224 |
| 2004/0114519 A1 * | 6/2004 | MacIsaac ...................... | 370/232 |
| 2004/0117624 A1 * | 6/2004 | Brandt et al. ................. | 713/166 |
| 2004/0205762 A1 * | 10/2004 | Ishiyama et al. ............. | 718/105 |
| 2005/0015624 A1 * | 1/2005 | Ginter et al. ................. | 713/201 |
| 2006/0034305 A1 * | 2/2006 | Heimerdinger et al. ...... | 370/408 |
| 2006/0191010 A1 * | 8/2006 | Benjamin ....................... | 726/23 |
| 2007/0094725 A1 * | 4/2007 | Borders .......................... | 726/22 |
| 2007/0150949 A1 * | 6/2007 | Futamura et al. ............. | 726/22 |
| 2007/0271614 A1 * | 11/2007 | Capalik .......................... | 726/23 |
| 2008/0086434 A1 * | 4/2008 | Chesla ............................ | 706/12 |

(Continued)

OTHER PUBLICATIONS

Julie Hull, et al., "Staying in Control", Cybersecurity and the Modern Electric Grid, IEEE Power & Energy Magazine, Jan./Feb. 2012 (8 pages).

*Primary Examiner* — Joseph P Hirl
*Assistant Examiner* — J. Brant Murphy
(74) *Attorney, Agent, or Firm* — Brooks, Cameron & Huebsch, PLLC

(57) ABSTRACT

Devices, methods, and systems for control system cybersecurity are described herein. One method includes receiving a plurality of measurements from each of a number of sensing and actuating devices of a control system, determining a suspected portion of the received measurements, monitoring the suspected portion of the received measurements over a particular time period, and determining whether the suspected portion of the received measurements is associated with a cyber attack.

13 Claims, 3 Drawing Sheets

(56) References Cited

U.S. PATENT DOCUMENTS

| | | | |
|---|---|---|---|
| 2008/0086435 A1* | 4/2008 | Chesla | 706/12 |
| 2008/0162390 A1* | 7/2008 | Kapoor et al. | 706/20 |
| 2008/0263663 A1* | 10/2008 | Ide et al. | 726/22 |
| 2009/0204802 A1* | 8/2009 | Araki et al. | 713/1 |
| 2010/0077483 A1* | 3/2010 | Stolfo et al. | 726/24 |
| 2010/0107245 A1* | 4/2010 | Jakubowski et al. | 726/22 |
| 2011/0032870 A1* | 2/2011 | Kumar | 370/328 |
| 2011/0185421 A1* | 7/2011 | Wittenstein et al. | 726/22 |
| 2011/0296005 A1* | 12/2011 | Labovitz et al. | 709/224 |
| 2011/0302653 A1* | 12/2011 | Frantz et al. | 726/22 |
| 2012/0131674 A1* | 5/2012 | Wittenschlaeger | 726/23 |
| 2012/0180126 A1* | 7/2012 | Liu et al. | 726/22 |
| 2012/0203508 A1* | 8/2012 | Hamzaoui et al. | 702/183 |
| 2012/0284790 A1* | 11/2012 | Bhargava | 726/22 |
| 2013/0091539 A1* | 4/2013 | Khurana et al. | 726/1 |
| 2013/0205393 A1* | 8/2013 | Hamzaoui et al. | 726/23 |

* cited by examiner

CONTROL SYSTEM CYBER SECURITY

TECHNICAL FIELD

The present disclosure relates to devices, methods, and systems for control system cyber security.

BACKGROUND

Many processes may rely on control systems to increase efficiency and/or automation, or otherwise optimize a number of operations of a physical system. Such processes may include manufacturing, production, power generation, fabrication, refining, water treatment and distribution, wastewater collection and treatment, oil and gas pipelines, electrical power transmission and distribution, wind farms, civil defense siren systems, large communication systems, heating, ventilation, and air conditioning systems (HVAC), access, and/or energy consumption, among other processes.

For various reasons, a person may launch a cyberattack against a control system. Such reasons may include cyber crime, extortion, and/or warfare, among others. The potential costs associated with an attack on processes such as gas refining, chemical manufacturing, and electric power supplying, for example, may be great.

Under previous approaches, measurements from various aspects of a control system (e.g., sensors) may be received and suspect (e.g., noisy) data may be discarded. Previous approaches may be vulnerable to a cyber attack because, for example, previous approaches may not recognize that the attack is occurring and/or has occurred. A successful attacker may be able to cause widespread power outages and/or environmental disasters, for instance, among various other possibilities. Such approaches may be vulnerable to attacks from within (e.g., by employees on site) and/or from afar (e.g., via the Internet).

DETAILED DESCRIPTION

Figure 1:
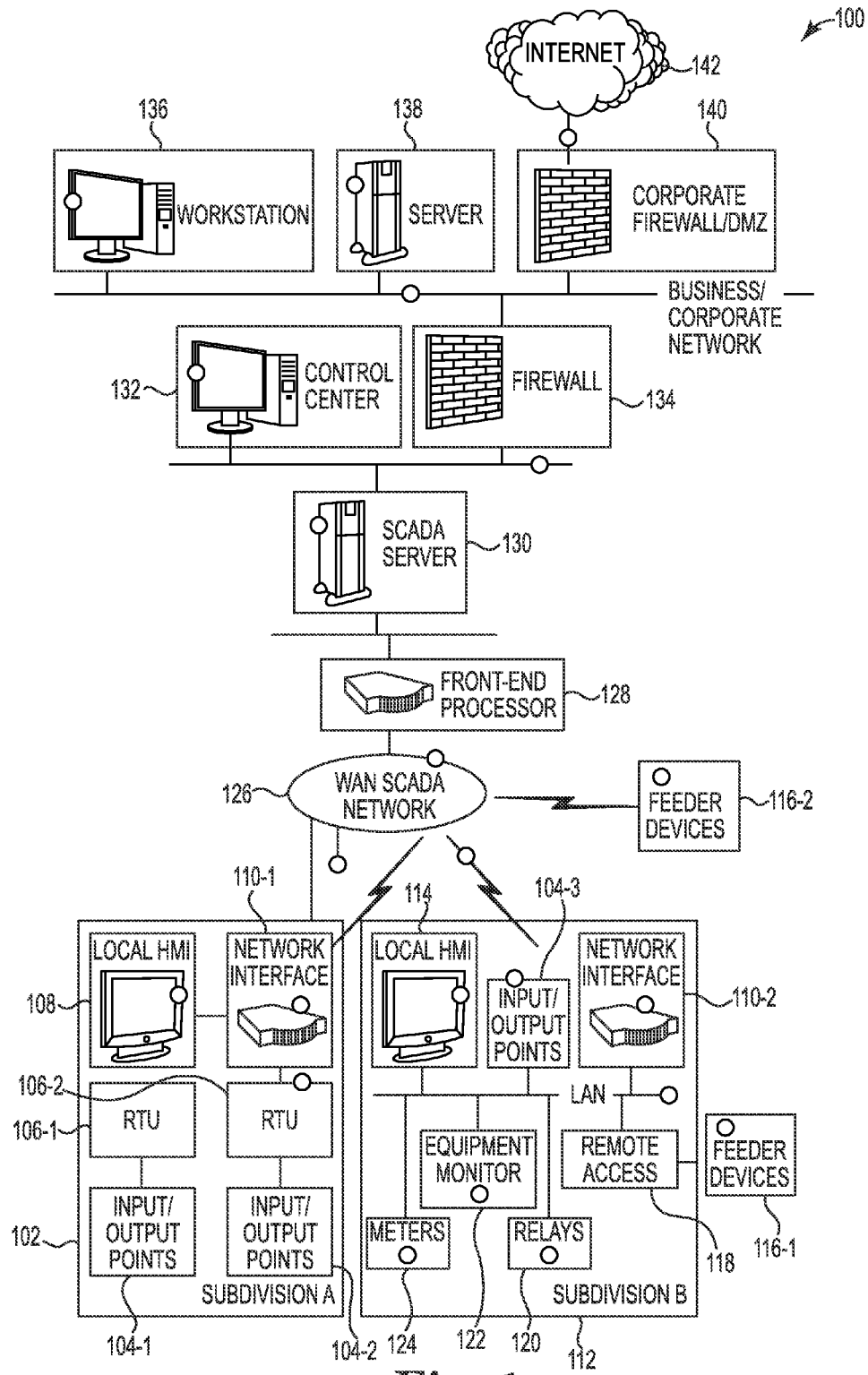
FIG. 1 illustrates a control system in accordance with one or more embodiments of the present disclosure.

Devices, methods, and systems for control system cyber security are described herein. For example, one or more embodiments include receiving a plurality of measurements from each of a number of sensing and actuating devices of a control system, determining a suspected portion of the received measurements, monitoring the suspected portion of the received measurements over a particular time period, and determining whether the suspected portion of the received measurements is associated with a cyber attack.

Control systems may be considered unique with respect to other systems in various ways. For example, a user (e.g., an administrator) overseeing a control system has an actual physical system against which the user can create a simulation and/or measure data. A simulator (e.g., executable instructions) can show what various values should be throughout a process (e.g., expected values). If, for instance, measurements are affected by a cyber attack, embodiments of the present disclosure can detect changes in the measurements by monitoring the physics of the process itself.

Control systems may be associated with manufacturing, production, power generation, fabrication, refining, water treatment and distribution, wastewater collection and treatment, oil and gas pipelines, electrical power transmission and distribution, wind farms, civil defense siren systems, large communication systems, heating, ventilation, and air conditioning systems (HVAC), access, and/or energy consumption, among other processes.

Control system cybersecurity in accordance with one or more embodiments of the present disclosure can be implemented using existing control system architecture (e.g., Distributed Control Systems (DCS) and/or Supervisory Control and Data Acquisition (SCADA)). Accordingly, embodiments of the present disclosure can receive values from SCADA and/or DCS and use those values in a simulation, for instance, to determine when they may be compromised by a cyber attack. Whereas, under previous approaches, measurements from various aspects of a control system (e.g., sensors) may be received and suspect (e.g., noisy) data may be discarded, embodiments of the present disclosure may retain and/or monitor suspect data to determine whether the data may have been intentionally changed in a cyber attack.

When a cyber attack is determined, embodiments of the present disclosure can take various actions. Various embodiments include locating the attacker and/or notifying authorities. Embodiments include providing the attacker with decoy (e.g., false) data such that the attacker is not made aware of his detection.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of blocks" can refer to one or more blocks.

FIG. 1 illustrates a control system 100 in accordance with one or more embodiments of the present disclosure. As shown in FIG. 1, system 100 includes a number of input/output points (e.g., sensors and actuators, sometimes generally referred to herein as "sensing and actuating devices"). Two such input/output points: input/output points 104-1 and input/output points 104-2 (sometimes generally referred to herein as input/output points 104) are illustrated in FIG. 1, though embodiments of the present disclosure do not limit control systems to a particular number of input/output points.

As shown in FIG. 1, input/output points 104 are included in a first subdivision 102 (e.g., subdivision A). Input/output points 104 can be communicatively coupled (e.g., such that information can pass in either direction) to a network interface 110-1 and/or a local human machine interface (HMI) 108 via one or more remote terminal units (RTUs), shown in FIG. 1 as RTU 106-1 and RTU 106-2 (sometimes generally referred to herein as RTU 106).

In the example illustrated in FIG. 1, control system 100 includes a second subdivision 112 (e.g., subdivision B). As shown, subdivision B includes meters 124, an equipment monitor 122, and relays 120 communicatively coupled to a local area network (LAN). Further, subdivision B includes a remote access 118 allowing communication between feeder devices 116-1 (e.g., reclosers, switch controllers, etc.) with device(s) in subdivision B. Additionally, subdivision B includes a local HMI 114, input/output points 104-3 and a network interface 110-2.

Subdivision A and Subdivision B can be connected to a wide area network (WAN) SCADA network 126. Subdivision A and Subdivision B can communicate through network 126 and a front-end processor 128 to a SCADA server 130 (sometimes generally referred to herein as computing device 130). A user may interact with computing device 130 via a control center 132, for instance. Computing device 130 and/or control center 132 may be separated from business and/or corporate network device(s) by a firewall 134. Such business and/or corporate network devices can include a workstation 136, and/or a server 138, among various others. Workstation 136 and/or server 138 may connect to the internet 142 through corporate firewall/demilitarized zone (DMZ) 140.

Included at various locations in control system 100 are circles indicating potential points (e.g., vectors) of cyber attack. Such locations include control center 132 and server 138, for instance. Points and/or vectors of attack are not limited to those locations shown with circles.

Potential cyber attacks on control systems include, for example, those using common protocols (e.g., Object Link and Embedding for Process Control (OPC) and/or Distributed Component Object Model (DCOM)). Such an attack may be leveled against, local HMI 108, for instance, as local HMI 108 may deploy such protocol(s). Potential attacks also include attacks via field device(s) (e.g., input/output points 104), database and/or data injection attacks (e.g., via the business/corporate network), and/or man-in-the middle attacks, among others.

To illustrate one or more embodiments of the present disclosure, control system 100 is discussed in the following example as a control system associated with an electric power system. As previously discussed, control systems are not limited to a particular system and/or process, nor are embodiments of the present disclosure similarly limited. In this example, input/output points 104-2 (controlled by RTU 106-2) can represent a measured voltage at a particular location (inputs) and/or the actuation of one or more switches (outputs) having an effect on that voltage.

Computing device 130 can receive data from various devices of system 100 (e.g., sensing and actuating devices and/or their respective controllers). Data can include measured values (e.g., measurements) and/or controlled values, for instance, such as values set by one or more controllers (e.g., set points). For example, computing device 130 can receive data from input/output points 104-2. Such data can be received according to a particular interval. Such data can be received over a particular duration and/or time period. Computing device 130 can receive data from controller(s) associated with sensing and actuating devices (e.g., proportional-integral-derivative (PID) controllers, not shown in FIG. 1). Such data can include calculations made by such controllers locally, for instance.

Under previous approaches, certain data may be filtered out. For instance, if a plurality of voltage measurements are received, a portion of those measurements may exceed a threshold. In an example, measurements that differ by a particular amount (e.g., 2 standard deviations) with respect to a mean of the plurality of voltage measurements may be discarded under previous approaches as being noisy and/or otherwise undesirable.

Embodiments of the present disclosure can retain such suspected (e.g., threshold-exceeding) measurements to determine if they are the product of cyber attack. Accordingly, computing device 130 can monitor the suspected portion of the received measurements over a particular time period. It is noted that various embodiments discussed with respect to computing device 130 are illustrative. That is, while computing device 130 can carry out various embodiments, alternative or additional computing devices can be utilized (e.g., computing device(s) in first subdivision 102 and or second subdivision 112, among others).

Based on particular characteristics, computing device 130 can determine whether the suspected portion of the received data and/or measurements is associated with a cyber attack. Computing device 130 can discern differences between faulty machinery, for instance, and a cyber attack. Suspected measurements due to normal operational failures of the electrical power system may exhibit certain characteristics, whereas suspected measurements associated with a cyber attack may exhibit a particular (e.g., different) signature. In order to recognize the difference, computing device 130 can receive historical information (e.g., cybersecurity knowledge and/or or known signals associated with "noise" and/or cyber attack(s)) for use in comparison.

Various embodiments can determine whether data has been falsified by comparing the data to operations of the physical system. For example, if certain data does not follow the laws of physics, such data can be flagged by various means (e.g., equation, first principle analysis, simulator or state estimator) as flawed for further analysis.

Computing device 130 can determine a cyber attack by comparing received measurements with expected measurements, for instance. Such expected measurements can be determined based on additional measurements received from the system being measured. Such expected measurements can be user-defined, for instance.

In the example of the power system, a first voltage measurement (e.g. V1) can be received from a first sensor, and a second voltage measurement (e.g., V2) can be received from a second sensor, for instance. A third voltage measurement (e.g., V3), may be dependent on V1 and/or V2 (e.g., because of the interconnected nature of the power system), and can therefore be estimated; that is, an expected value for a measurement of V3 can be determined based on the measurements for V1 and/or V2. Additionally, an actual measurement of V3 can be received. Embodiments of the present disclosure can compare the expected measurement of V3 with the received measurement of V3. If a difference between the expected measurement and the received measurement exceeds a particular threshold, computing device 130 can monitor (e.g., flag) the measurement of V3 for potential cyber attack.

Further, a user can associate known mechanical failures, for instance, with a particular signal received by computing device 130, such that over time, computing device 130 can learn common signals not indicative of cyber attack. In the example of the power system, a state estimator can be run against an entire electric grid for a utility which takes a particular time period to be run. The state estimator can receive measurements during the run (e.g., first run) and predict a next state of the system prior to integrating the received measurements.

When the received measurements are integrated into the next (e.g., second) run, embodiments of the present disclosure include comparing expected measurements and actual (e.g., received) measurements during the second run. Computing device 130 can make such a comparison to determine whether manipulations have been made in the measured variables and/or other data (e.g., from a cyber attack).

Additionally or alternatively, a user and/or computing device 130 can determine certain physical aspects of the system that exceed a particular threshold of importance. Such aspects can be given increased scrutiny and/or can be linked to alarms. For example, a threshold-exceeding voltage in a particular current conductor may yield disastrous results. A notification (e.g., an alarm) can be provided to a user (e.g., via control center 132) before and/or upon such a voltage exceeding the threshold.

Additionally or alternatively, measurements received during and/or from the first run of the state estimator can be fed into a simulator (e.g., simulation software) and/or otherwise checked for accuracy (e.g., using calculations based on other measurements and/or data from the system). The processes and/or outcome of a simulation of the second run can be compared with the processes and/or outcome of the second run itself. Particular (e.g., threshold-exceeding) deviations from the simulation may be indicative of cyber-attack.

If computing device 130 determines a cyber attack is occurring and/or has occurred, computing device 130 can take various actions. Computing device 130 can attempt to locate the attacker. Computing device 130 can notify proper authorities of the attack. Computing device can determine the point and/or vector of the attack. Computing device 130 can block the vector of the attack Computing device 130 can determine a type of the attack and tailor a response strategy accordingly.

If, for example, the attack included one or more measurements being falsely set by the attacker, computing device 130 can correct the measurement. Computing device 130 can notify one or more users to correct the measurement. Further, computing device can conceal the correction from the attacker and/or providing the attacker with decoy (e.g., false) measurements such that the attacker is not made aware of his detection. Such ignorance on the part of the attacker of his detection may aid in his capture.

Figure 2:
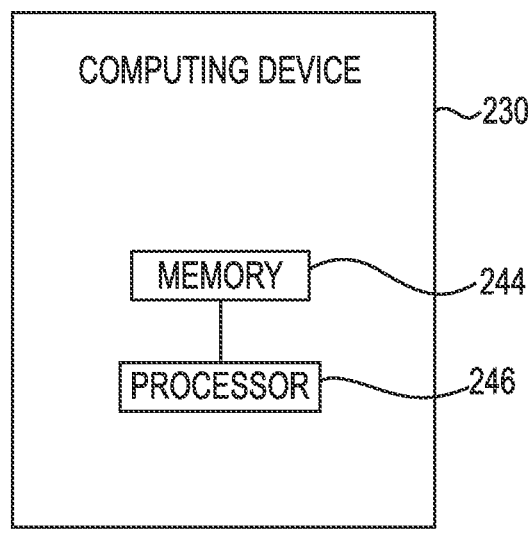
FIG. 2 illustrates a computing device for control system cybersecurity in accordance with one or more embodiments of the present disclosure.

FIG. 2 illustrates a computing device 230 for control system cybersecurity in accordance with one or more embodiments of the present disclosure. Computing device 230 can be, for example, a laptop computer, a desktop computer, or a mobile device (e.g., a mobile phone, a personal digital assistant, etc.), among other types of computing devices. Computing device 230 can be analogous to computing device 130, for instance, previously discussed in connection with FIG. 1. As previously discussed, computing devices used in embodiments of the present disclosure are not limited to particular devices and/or locations within control system architectures. For example, various embodiments may utilize server machine(s) within subdivisions (e.g., subdivision A, previously discussed in connection with FIG. 1)

As shown in FIG. 2, computing device 230 includes a memory 244 and a processor 246 coupled to memory 244. Memory 244 can be any type of storage medium that can be accessed by processor 246 to perform various examples of the present disclosure. For example, memory 244 can be a non-transitory computer readable medium having computer readable instructions (e.g., computer program instructions) stored thereon that are executable by processor 246 to provide control system cybersecurity in accordance with one or more embodiments of the present disclosure.

Memory 244 can be volatile or nonvolatile memory. Memory 244 can also be removable (e.g., portable) memory, or non-removable (e.g., internal) memory. For example, memory 244 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 244 is illustrated as being located in computing device 230, embodiments of the present disclosure are not so limited. For example, memory 244 can also be located internal to another computing resource (e.g., enabling computer readable instructions to be downloaded over the Internet or another wired or wireless connection).

Figure 3:
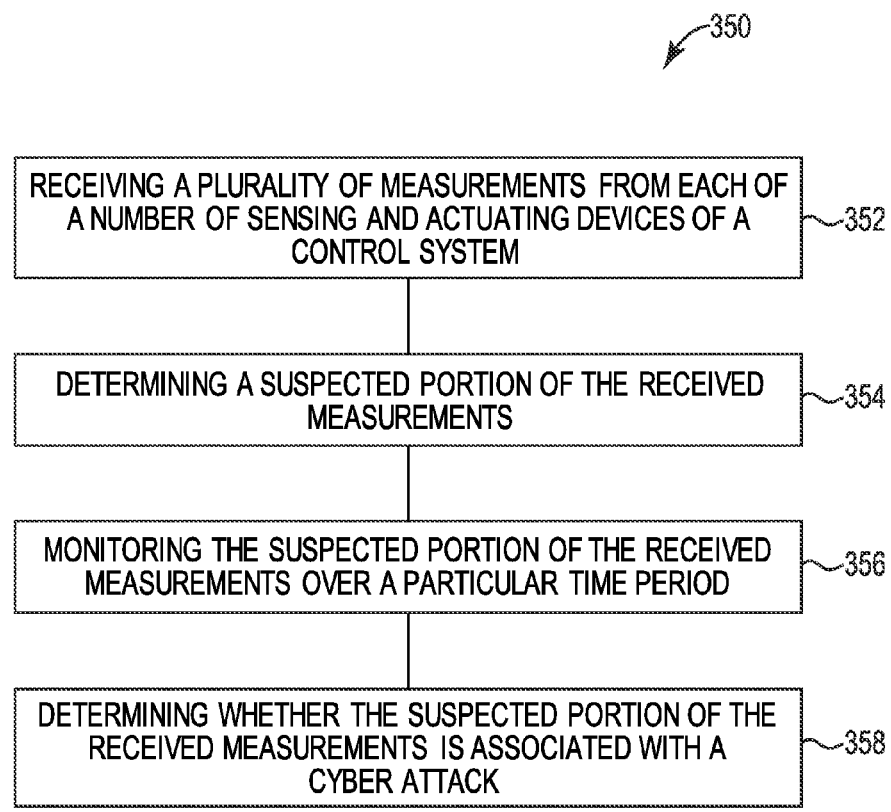
FIG. 3 illustrates a method for control system cybersecurity in accordance with one or more embodiments of the present disclosure

FIG. 3 illustrates a method 350 in accordance with one or more embodiments of the present disclosure. Method 350 can be performed, for example, by a computing device, such as computing device 230 previously discussed in connection with FIG. 1 and/or FIG. 2.

At block 352, method 350 includes receiving a plurality of measurements from each of a number of sensing devices of a control system.

At block 354, method 350 includes determining a suspected portion of the received measurements. A suspected portion of the received measurements can be determined in a manner analogous to that previously discussed in connection with FIG. 1, for instance.

At block 356, method 350 includes monitoring the suspected portion of the received measurements over a particular time period. The suspected portion can be retained and/or monitored in a manner analogous to that previously discussed in connection with FIG. 1, for instance At block 358, method 350 includes determining whether the suspected portion of the received measurements is associated with a cyber attack. Determining whether the suspected portion is associated with a cyber attack can include comparing the received values with expected values, using simulators, and/or other methods previously Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the

What is claimed:

1. A method, comprising:
receiving, by a computing device, a first plurality of measurements gathered by each of a number of sensing and actuating devices of a control system over a first time period;
determining, by the computing device, a predicted second plurality of measurements associated with a second time period later than the first time period;
receiving, by the computing device, a second plurality of measurements gathered by each of the number of sensing and actuating devices of the control system over the second time period;
determining, by the computing device, a suspected portion of the received second plurality of measurements based on a difference between the predicted second plurality of measurements and the received second plurality of measurements exceeding a particular threshold;
monitoring, by the computing device, the suspected portion of the received second plurality of measurements over a particular time period;
determining, by the computing device, whether the suspected portion of the received second plurality of measurements is associated with a cyber attack;
determining a measurement falsely set by the cyber attack;
correcting the measurement falsely set by the cyber attack; and
providing at least one decoy measurement to an attacker to conceal the correction.

2. The method of claim 1, wherein the method includes determining whether the suspected portion of the received second plurality of measurements is associated with a cyber attack based, at least in part, on historical cyber attack information.

3. The method of claim 1, wherein the method includes determining whether the suspected portion of the received second plurality of measurements is associated with a cyber attack based, at least in part, on historical measurements not indicative of a cyber attack.

4. The method of claim 3, wherein the method includes receiving an indication, made by a user, of the historical measurements not indicative of a cyber attack.

5. The method of claim 1, wherein the method includes:
determining a received measurement of the suspected portion of the received second plurality of measurements exceeding a particular importance threshold; and
providing a notification responsive to the received measurement of the suspected portion of the received second plurality of measurements exceeding a particular threshold.

6. The method of claim 1, wherein the control system is associated with an electric grid.

7. A non-transitory computer-readable medium having instructions stored thereon executable by a processor to:
receive a first set of measurements from a first operation of a control system, the first set of measurements gathered by each of a number of sensing and actuating devices of the control system;
conduct a simulated second operation of the physical system using the first set of measurements;
determine an expected second set of measurements based, at least in part, on the simulated second operation of the physical system;
receive a second set of measurements from a second operation of the control system, the second set of measurements gathered by each of the number of sensing and actuating devices of the control system, wherein the second operation occurs later than the first operation;
determine a suspected portion of the received second set of measurements based on a difference between the simulated second operation and the second operation exceeding a particular threshold;
monitor the suspected portion of the received second set of measurements over a particular time period;
determine whether the suspected portion of the received second set of measurements is associated with a cyber attack;
determine a measurement of the second set of measurements falsely set by the cyber attack;
correct the measurement falsely set by the cyber attack; and
provide at least one decoy measurement to an attacker to conceal the correction.

8. A control system, comprising:
a plurality of sensing devices, each configured to:
gather a respective first plurality of measurements from a physical system over a first time period; and
gather a respective second plurality of measurements from the physical system over a second time period; and
a computing device, configured to:
receive the respective first plurality of measurements gathered by the plurality of sensing devices over the first time period from each of the sensing devices;
predict a respective second plurality of measurements for each of the sensing devices based on the respective first plurality of measurements;
receive the second plurality of measurements gathered by the plurality of sensing devices over the second time period;
compare the respective predicted second plurality of measurements with the received second plurality of measurements; and
take an action associated with a determined cyber attack responsive to a difference between the respective predicted second plurality of measurements and the received second plurality of measurements exceeding a particular threshold, wherein taking the action includes determining a measurement of at least one of the first and second plurality of measurements falsely set by the cyber attack, correcting the measurement falsely set by the cyber attack, and providing at least one decoy measurement to an attacker to conceal the correction.

9. The control system of claim 8, wherein the computing device is configured to provide a notification associated with the determined cyber attack.

10. The control system of claim 8, wherein the computing device is configured to determine an attack vector associated with the determined cyber attack.

11. The control system of claim 8, wherein the computing device is configured to determine the action based, at least in part, on a type of the determined cyber attack.

12. The control system of claim 8, wherein the control system is a distributed control system.

13. The control system of claim 8, wherein the control system is a supervisory control and data acquisition system.

* * * * *